US008727859B2

(12) United States Patent
Nkouatchet Wandji

(10) Patent No.: US 8,727,859 B2
(45) Date of Patent: May 20, 2014

(54) COMPONENT FOR REDUCING INSTABILITY IN AN INTERACTIVE AND PARTICIPATORY SYSTEM

(76) Inventor: Hugues Nkouatchet Wandji, Munich (DE)

( * ) Notice: Subject to any disclaimer, the term of this patent is extended or adjusted under 35 U.S.C. 154(b) by 251 days.

(21) Appl. No.: 13/331,994

(22) Filed: Dec. 20, 2011

(65) Prior Publication Data

US 2013/0157765 A1 Jun. 20, 2013

(51) Int. Cl.
*A63F 9/24* (2006.01)
(52) U.S. Cl.
USPC .............................................. 463/16; 463/42
(58) Field of Classification Search
CPC .................................. A63F 9/24; G06F 17/18
USPC .............. 463/9, 16, 17, 18, 19–21, 40, 41, 42
See application file for complete search history.

(56) References Cited

U.S. PATENT DOCUMENTS

| | | | | |
|---|---|---|---|---|
| 7,909,691 | B1 * | 3/2011 | Skatter | 463/21 |
| 8,532,798 | B2 * | 9/2013 | Ferraro et al. | 700/91 |
| 2003/0200053 | A1 * | 10/2003 | Gianella | 702/181 |
| 2005/0116410 | A1 * | 6/2005 | Vlazny et al. | 273/139 |

OTHER PUBLICATIONS

Zadeh, Lotfi A., et al., "Fuzzy Sets and Applications," John Wiley & Sons, Inc., pp. 29-44, 1987.
Rosen, Kenneth H., "Discrete Mathematics and Its Applications," Sixth Ed., (NY: McGraw-Hill), pp. 384-385, 2007.

* cited by examiner

*Primary Examiner* — Damon Pierce
(74) *Attorney, Agent, or Firm* — Novak Druce Connolly Bove + Quigg LLP

(57) ABSTRACT

A support system for the prediction of occurrence zones of random phenomena, based on a new model named "instable sets" is disclosed. The calculation or construction of subsets of weak instabilities allows delimiting a small zone, in which random events appear with a high probability. The system implements a process of characterizing instable sets or subsets of lottery combinations so as to enable an approach of efficient and at the same time participatory gaming. In particular, the system supports configuring options of the game by means of a novel process that make the emission of reusable prognosis for multiple users in an interactive mode possible.

18 Claims, 13 Drawing Sheets

| Only combinations that satisfy all the defined criteria are selected! ⑦ | | Min | Max |
|---|---|---|---|
| Quantity of adjacent numbers | ⑦ | 3 ▼ | 5 ▼ |
| Quantity of even numbers | ⑦ | 0 ▼ | 6 ▼ |
| Quantity of odd numbers | ⑦ | 2 ▼ | 5 ▼ |
| Quantity of even and adjacent numbers | ⑦ | 0 ▼ | 6 ▼ |
| Quantity of odd and adjacent numbers | ⑦ | 1 ▼ | 6 ▼ |
| Quantity of primes | ⑦ | 0 ▼ | 6 ▼ |

| Only combinations that meet a minimum number of defined criteria are selected! ⑦ | Min | Max |
|---|---|---|
| Average | 8 ▼ | 44 ▼ |
| Length of combination | 10 ▼ | 36 ▼ |
| Distance between two consecutive numbers | 1 ▼ | 44 ▼ |
| Quantity of repeated distances between consecutive numbers | 1 ▼ | 4 ▼ |
| Quantity of different distances between consecutive numbers | 3 ▼ | 6 ▼ |
| Quantity of different unit numbers | 2 ▼ | 5 ▼ |
| AC Wert ⑦ | 3 ▼ | 9 ▼ |
| Number of allowed mismatches ⑦ | | 1 ▼ |

Quantity of lottery numbers from the first partition in each combination [4 ▼] ⓘ —307

Partition 1                    Partition 2

Number of blocks [2 ▼]

Drag your desired numbers in the lower vessel

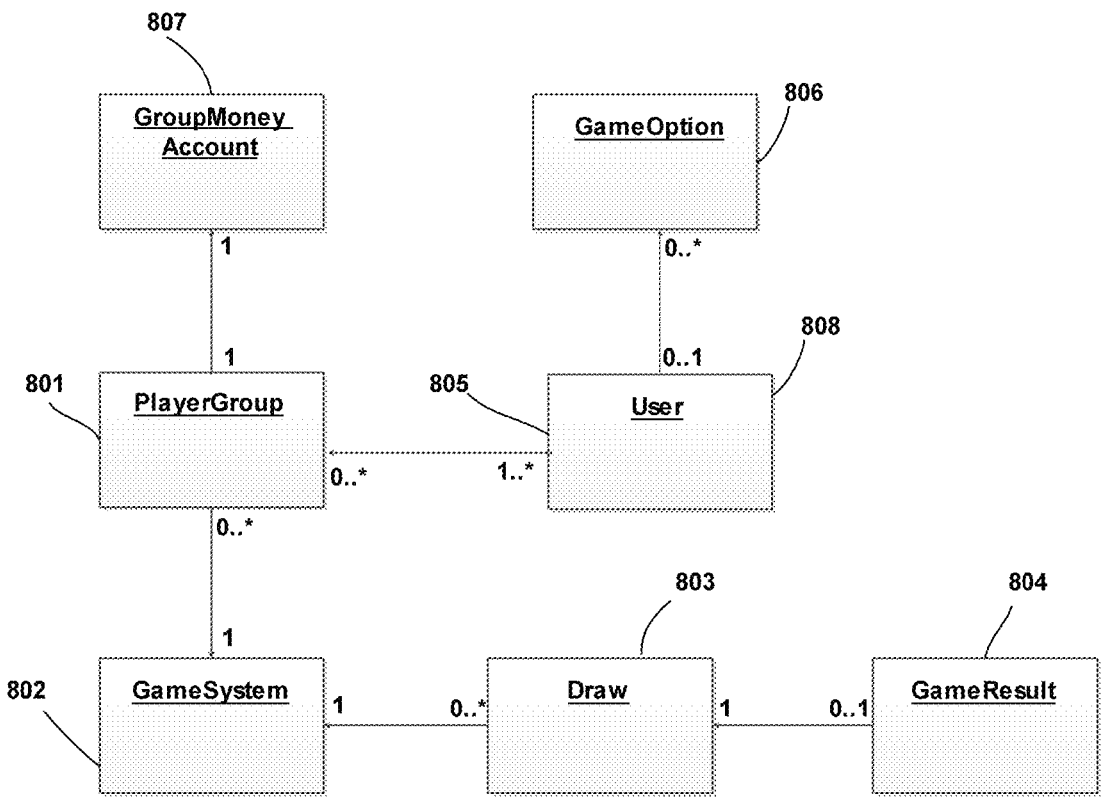

Fig. 8

{"num":6,"den":49,"ops":{"op2":1,"op3":1,"op4":1,"op7":1,"op8":1},"step":"step9","mns":["15"],"qns":["17","6","4","12","34","45","47","1","5","2"],"pd":"12","pns":["27","31","38","40","20","7","36","30","22","49","44"],"p1ns":"4","p2nbs":["28","32","33","41","49","31","30","29","36","43","7","10"],"bq":"4","bcs":{"bnr1":["9","10","11","14","15","16","18","21","22","24","26","28","30","31","35","36","38","40","41","42","43","44","48","49"],"bnr2":["3","7","8","11","14","15","16","18","23","25","27","28","29","30","37","42","43","46","48","49"],"bnr3":["3","8","9","10","13","15","16","18","20","22","23","26","27","32","33","35","38","39","41","43","46","49"],"bnr4":["3","7","8","1

Fig. 9A

```
// script function for collecting configuration parameters on the terminal computer
// and sending them together with the next step ID to the server computer
function getNextStep (pagename, eltNames, eltValues) {
        // initializing an object to collect the parameters
        var values = {};
        // collecting parameters from the arrays containing the parameter names on one side
        // and the values collected during interaction with the user on the other side
        for (var i = 0; i < eltNames.length; ++i) {
                values[eltNames[i]] = eltValues[i];
        }
        // use pagename parameter to decide if the next or the previous step is to be loaded
        // from server
        if (pagename == "next") {
                active_page++;
        } else if (pagename == "prev") {
                active_page--;
        }
        // the step to be displayed next is choosen from a pool of possible steps
        values['step'] = active_pages[active_page];
        // load the next step and its contents to display
        $('.content_202').load("path/to/stepController/step}", {data: "step parameters",
        function() {
                // implementation of any user interface dynamic effect during the load
        });
}
```

*Fig. 9B*

```
// method receiving request with option parameters within the server computer method step() {

// storing the incoming parameters in a JSON object

Object json = parseIntoJSON(params.data);

// update the session with the new configuration parameters session.options.addAllParams(json);

// use the parameter step to invoque the next step contents render(json.step)

… # COMPONENT FOR REDUCING INSTABILITY IN AN INTERACTIVE AND PARTICIPATORY SYSTEM

BACKGROUND OF THE INVENTION

1. Field of the Invention

The present invention relates to a set of computers operating in a network and helping users which are geographically distant to resolve the practical problem of indecision in a lottery in an individual and participatory way. More broadly, the foundations of this invention can be applied also in various areas such as quantum physics, insurances (selection and prevention of risks), decision support systems or diagnostic support systems.

2. Description of the Prior Art

It is interesting to notice how the task consisting of marking the lottery table resp. a bingo card, which appears to be at the same time common place and trivial, often takes the style of a real brain teaser. This observation is a striking sign indicating that each participant concedes to this game in his subconsciousness a portion of determinism. The object of the present patent is the description of a novel general procedure which supports the forecasting of random phenomena as well as the description of its implementation in a lottery. It is discussed to introduce some determinism in areas which a priori are completely random. The application of this to lottery results in a system which provides a user at an individual level with the possibility to control and influence his chances in this game and also, as an extension, to participate therein together with other users in a collaborative resp. participatory way.

The scenario of an indecisive participant resp. player trying to define for himself the best subset of winning combinations is an example, which can be extrapolated to technical domains, where the random character of events renders forecasts difficult. By leaning on the observation of a large number of events, it is possible in certain cases (of which a lottery is just one) to characterize small subsets which comprise with a large probability the next events resp. elements which will extirpate in a random manner from the set of all the events resp. elements. This observation inspires a novel approach which the inventor has called "instable sets" and which adopts the notion of a characteristic function which is known notably in the theory of vague (i.e. Fuzzy) (sub-)sets, which has been formulated for the first time by Lotfi Zadeh in 1965 to account for defined sets in an imprecise manner [Ref. 1].

A basis for the theory of vague (i.e. Fuzzy) subsets of a set E is the definition of a characteristic function for every subset A, which associates to each element x of E not only one of the values 0 (to indicate that x does not belong to A) and 1 (to indicate that x belongs to A), but eventually any other value comprised in the interval of real numbers between 0 and 1, i.e. [0, 1]. The associated value expresses a degree of membership, wherein a value close to 1 indicates that x can be considered as very likely belonging to A.

It is a characteristic of the notion of a vague (i.e. Fuzzy) subset A of E, beyond all the imaginable variations in its application, that in the formulation A corresponds to a preconceived model which determines the nature of the characteristic function. For example, this is the case when one defines A to be a set of points, which define an ambiguous figure in a three-dimensional space E in a precise region of this space. A characteristic function of the Fuzzy set A may thus give the degree of membership of any point in (the set) E to (the subset) A. Suppose now that (the subset) A is defined by any exact restriction on (the set) E and that the characteristic function of the Fuzzy (subset) A is defined as the probability that an element, which has been selected at random from (the set) E, obeys the criteria defining (the subset) A. In order to construct such a subset A, a notion of instability is introduced as follows:

$$Inst_x(A) = Card(A)/F_x(A/E),$$

where $F_x(A/E)$ is the frequency satisfying the criteria defining (the subset) A for the x last elements of E until the selection at random, Card(A) is the number of elements of A. (For the needs of the present invention, considerations are limited to cases of finite sets herein.)

According to the area of application and the way in which the restriction for (the subset) A is defined, one can substantially reduce the efforts necessary to constitute the set, to which the next event will belong with a large probability. By introducing a process of elaborating (such) instable sets, it may become possible to predict in a more deterministic way the next event in a sequence of random events. Similarly, in other technical fields, e.g. in quantum physics, the scientists may envisage a more deterministic description e.g. of the phenomenon of the radioactive decay of atoms as an alternative approach to the "absence of memory" of the atoms admitted in this field. Also, as another example, a different type of representation of atomic orbitals can be envisaged with this novel approach.

Aiming to apply these notions to the maximization of chances in a lottery game, one is interested in the subsets A of weak instability in the set of possible combinations in a lottery system. Such a technique is likely to upset the way in which millions of people in the world participate in a lottery. Indeed, thanks to its application, many people will have the possibility to experience another way to play in a lottery, which will not be governed completely by chance and randomness. Until the present day, there is not a single computer system distributed across a network of computers, that would offer to its users the possibility to generate optimized predictions of random events, in particular optimized combinations of lottery numbers, or to create a synergy and an interaction among them. The present invention shall fill in this void.

SUMMARY OF THE INVENTION

Herein, a system is disclosed, which makes it easy and simple to construct the subsets of weak instability, in particular in the framework of a lottery, and which provides at the same time to a user all technically realizable advantages for maximizing his chances in an individual or collaborative resp. participatory way. More precisely, the subject of this invention is a component designed as an assembly of logical modules functioning in a distributed computer environment. This component is accommodated in the central device for calculating the subsets, which is the server computer 101. The invention enables this server computer to provide across the whole network 106, e.g. the internet, to provide adequate response to terminals 102-105 used by the participants, e.g. lottery players. These terminals are the client's computers, which present an interface, by which a user can construct systematically the instable subsets with support of interactive configurations.

In the context of this system, the set E for each lottery system of drawing p numbers from a total of n numbers is the set of all the combinations of p in n. The user has to select a proposed lottery system in order to make his optimizations. Through the proposed component according to the invention, the system defines eight configurable main options for reducing the set of combinations, from which the subsets (e.g. lottery number tables) to be proposed to the user are to be selected for validation. Each of these options specifies restrictions on the global set E under a different precisely defined rule. The system makes use of these options in order to support the users to configure their selections, e.g. their lottery table, in an autonomous way or by guiding them. At the end of this configuration, the system generates by randomization the combinations issued from the instable sets. These same said options provide to the system the capability to calculate and present personnel (or individual) statistics to the users and, in addition, introduces an approach of a collaborative participation, e.g. playing a lottery within syndicates.

The first option prescribes simply that two generated combinations (lottery tables) shall not contain exactly the same numbers. This allows straight away to move aside the possibility of generating the same combinations. According to the second option, the user can select a number $\alpha$ of numbers which must appear obligatorily in each of his combinations. Evidently, $\alpha$ shall be at maximum equal to the number of numbers to be marked (or selected) for each combination, e.g. lottery table of the game. This option reduces considerably the set of combinations to be considered, but has the disadvantage to be rather radical and more risky. The fourth option minimizes this risk as will be seen.

It can be judicious to eliminate such numbers which, according to the history of recent drawings in the chosen system, have a very low probability of reappearing in the next drawing. Almost all participants of lotteries, i.e. lottery players, take into account such empiric data in the selection of their combinations. Still in the interactive mode, the third option of the system handles this strategy which therefore reduces considerably the set of combinations to be considered.

If in the second and third option (see FIGS. 3A and 3B) the user has to take the radical decision to impose or to move aside certain numbers susceptible to reappear in the next drawing for the first time and not susceptible for the second time, the fourth option (FIG. 3C) allows to relativize things by offering the possibility to increase or to reduce considerably the frequency of the appearance of certain numbers in the combinations which are to be generated at the end of the process. This option does not reduce the instable set in itself, but imposes a weighting on it.

At a closer look, the numbers of each drawing of the lottery generally behave according to modelable mathematical relations, of which the fifth and sixth options (see FIG. 3D and FIG. 3E) provide a complete synthesis. It can for example be observed that in a single drawing, two or three pairs of numbers following each other in the order of all numbers, do rarely appear. One also observes generally a certain distribution of even and odd numbers, a limited appearance of the former (or latter) numbers, the appearance of even or odd numbers which follow each other, etc. These options provide to the user the possibility to filter the generated combinations at the end of the process, so as to obtain at the end combinations (lottery tables) corresponding to "plausible models". According to the fifth option, six filters are conceived, of which each is determined by a minimum and a maximum which come in a range as a function of the chosen system of lottery resp. game (notably the important parameters p and n). Unlike the fifth option, in the sixth option, the data of the filtering come down more to groups of numbers than to numbers themselves taken individually. Here, in the sixth option, seven filters are provided which control data such as the mean value of the marked numbers, the difference between the smallest and the largest number, the minimum or maximum difference between two successive numbers, more or less complex values such as the repetition of the differences or even the AC value, which is a rather interesting indicator of the random character of the distribution of the numbers of a drawing. It is in consideration of the less intuitive legibility of the criteria of the filtering in the sixth option, that a degree of tolerance is introduced in addition to the filtering parameters, so that the user decides if all these criteria must be respected strictly (tolerance 0) or if a combination may still pass the filtering if it obeys at least $(7-\alpha)$ criteria, where $\alpha$ is a tolerance parameter (and $0 \leq \alpha \leq 7$).

The seventh option (see FIG. 3F) is useful in cases where a user judges that is of interest to partition his combinations. In other words, the generated combinations will draw their numbers from two distinct groups of numbers. Each combination shall contain a certain fixed number of numbers which come from the first group and the rest from the second group. Finally, according to the eighth option (see FIG. 3G) which conceives the generation of combinations in blocks, the user has available another type of partitions which do not split up the numbers of the combinations in two distinct groups as in the seventh option. Generating the combinations in blocks is understood herein to mean selecting a number of groups of numbers, herein called blocks, with the particularity that all the numbers of the combinations shall be issued each time from the same block. In other words, it is excluded that the numbers of a generated combination belong partially to one block and partially to another block.

The system offers excellent means for automatically generating combinations. However, it is also permitted to each user to manually select combinations as a complement to those which are issued from automatic generations. The combinations which are selected manually have no influence on the process of automatic generation, since they are based on the instable sets formed by configuration.

Another function of the system is the assisted parameterization, which is particularly interesting for those who are not so much interested in or involved in the understanding of the aforementioned different options of choice but more in view of the automatic generation. By using an assistant (e.g. a wizard), the user can permit automatic selection of the options on the basis of default configurations. The user is just oriented across the different options proposed by the system, where he also has the possibility to modify the configurations if he so wishes. If one opts for using the automatic assistant (e.g. wizard), one has to indicate the number of combinations that one wishes to generate right from the beginning of the process, because the system elaborates a suitable plan of configurations on this basis.

The statistics on the recent drawings provide an efficient instrument to the user of the system for forming suitable instable sets. The system provides multiple statistical views to this end. In addition, the system has the particularity to directly use the device for parameterization of the options in order to elaborate personalized statistics which it will present to the user in graphical or textual form.

In the textual form, the personalized statistics allows the user to view at each step of the configuration two important pieces of information: The number of combinations present in the instable set as constructed up to the present step, and the relation of this quantity to the total number of possible combinations for the selected lottery system.

If the textual form can be invoked at each step of the parameterization, the graphical form shows up only at the end of the process of parameterization, in order to allow the user to view exactly on one hand, which ones of the last ten (or any other predetermined number) last drawings satisfy his parameterization completely, and on the other hand, to evaluate by a characteristics (e.g. a curve) which represents the percentage of coincidence in the last 100 drawings, which global trend his parameterization follows throughout the duration (226). One of the ten (or any other number) of the last drawings is said to satisfy the parameterization, if the combination in this drawing belongs to the instable set constructed by the user (refer to the green sign in FIG. 2C), it is said to partially satisfy the parameterization if at least half of the numbers of his combination belongs to at least one combination of the constructed instable set (see the yellow sign in FIG. 2C), and otherwise it does not satisfy at all the parameterization of the user (see to the red sign in FIG. 2C).

The device of configurable options also enables a collaborative approach (e.g. a collaborative operation of the system) which allows users, who are geographically spaced apart and who eventually do not know each other, to communicate with each other and to agree on strategies of selecting the best instable subsets (of combinations). The system integrates modules in order to facilitate the interaction between users in view of emitting prognosis, to reuse prognosis and/or to form virtual clubs and/or participate in syndicates (e.g. play lottery game as a group).

The system provides for the possibility to emit configurations which are reusable by other participants (e.g. players). This process is herein called "emission of prognosis". In fact, this involves configuring a complete parameterization of the game, including the number of combinations to be generated, a number which may not exceed a maximum p. At the end of the process (when the last option is configured and validated), the generated combinations are presented to the user. The user may then even adjust each one of these, however under the condition that each new combination still corresponds to the parameterization of the prognosis. The prognosis (or forecasts) are registered by the system, which undertakes to evaluate them after the real drawing for which they have respectively been emitted. Registering a prognosis means storing the parameterization and all related combinations, e.g. in the data base 109 of the system 101 shown in FIG. 1.

The system also provides for a method of classifying the prognosis (or forecasts) in order to allow the users to reutilize the best ones thereof. This classification is based on a value, which is herein called "compact score" and which is a ticking off (or pointing) determined by the real score of the prognosis (the winning combinations thereof) according to a formula which is itself a function of the selected lottery system. The compact score is determined so as to give a net advantage to a forecaster who produces the best combinations (in terms of quantity and of quality) with a minimum number of combinations associated with the prognosis.

In summary, there is provided a component of a computer system allowing the development of clear, simple and reusable strategies in order to therewith optimize hit probability in a random system, such as a lottery, in an individual or collaborative way. The component implements a process based on a set of configurable options which reduce under different aspects (or rule sets) the set of combinations judged plausible. This component is implemented in the form of an assembly of software modules, which are developed to function in (e.g. to run on) an application server computer and to be distributed by a web-server on any number of terminals connected to the server computer over a network, such as the internet. Apart from the construction of the best instable subsets of combinations, the system also provides for putting a large number (e.g. thousands) of users in synergy with respect to strategies of operation (i.e. strategies of playing in a lottery), and to this end the system presents for an intuitive user interface, which simulates real scenarios and tickets of the game, e.g. lottery tables, which conceals the complex relations underlying the procedure.

BRIEF DESCRIPTION OF DRAWINGS

FIG. 2 consists of FIGS. 2A, 2B and 2C.

FIG. 4 is composed of FIGS. 4A, 4B and 4C and illustrates the interactions between the terminals and the server during the accomplishment of a working process according to the invention.

FIG. 5 is composed of FIGS. 5A and 5B.

FIG. 8 shows the units and connections as used by the server in order to implement the collaborative function on the basis of the formation of syndicates and the reuse of configurations.

FIG. 9 consists of FIGS. 9A, 9B and 9C. FIG. 9A shows a representation of data stored in the server computer during option configurations. FIGS. 9B and 9C show a pseudo code explaining the way option parameters are processed both in server computer and terminals.

DETAILED DESCRIPTION OF PREFERRED EMBODIMENTS

A mode of realization of the invention as described in the following is an implementation of logical operations executed in a component which is designed to be integrated in a system of distributed computers, which system is constituted by a server 101 and clients or terminals 102, 103, 104, 105, which send requests to the server and receive responses across a network 106 such as the internet. It is to be noted that the component which constitutes the object of the present invention can be implemented in various manners, and the different modules as well as their assembly can be realized in other forms than those described herein without the conceptual scheme having to be modified for this purpose. The Figures and the embodiments described in the following merely serve as examples and illustrate the principal elements of the system and are not intended to limit the scope of the invention which shall be governed by the appended claims.

Figure 1:
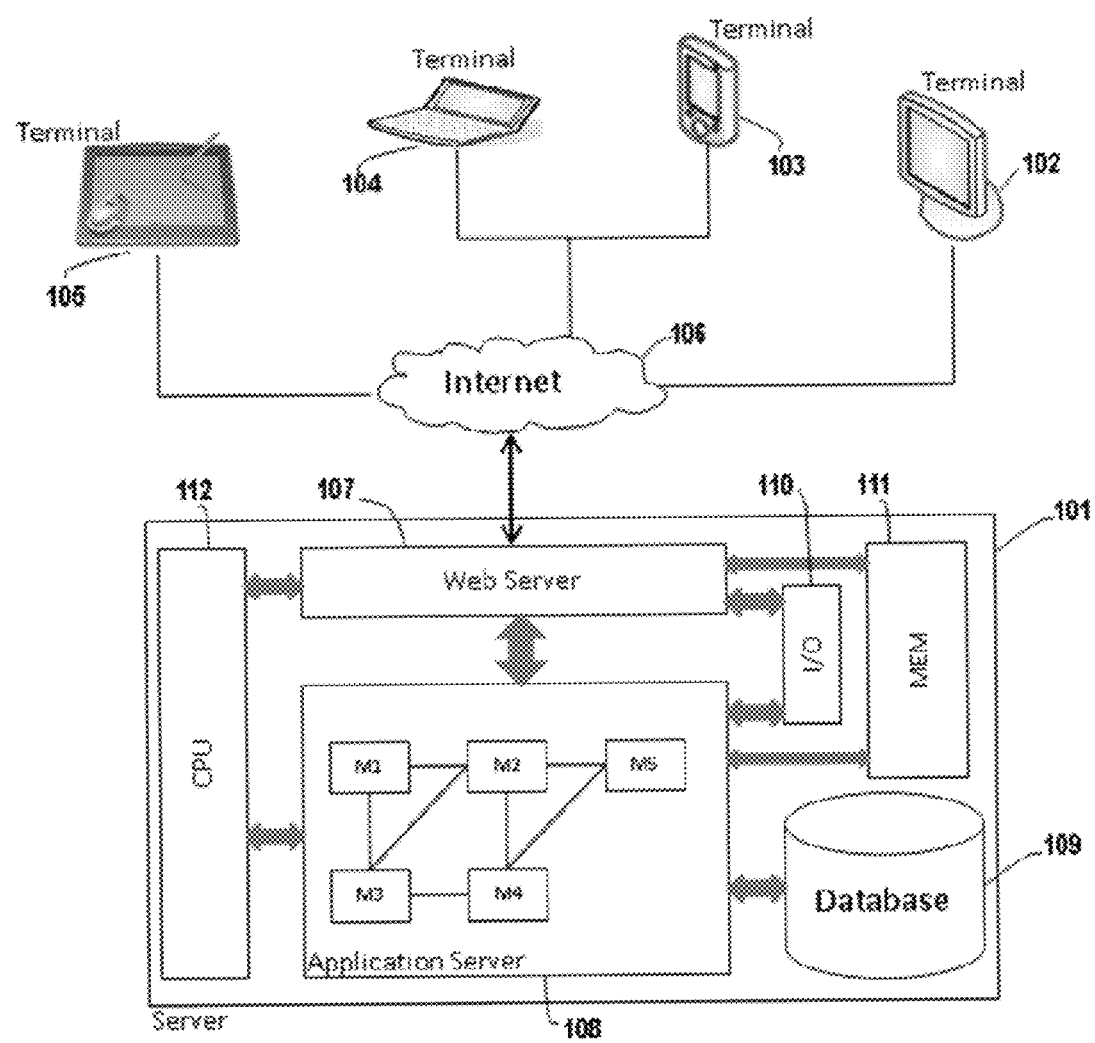
FIG. 1 illustrates a distributed computer system comprising a server which communicates with terminals in a network (here: e.g. the internet) in order to perform the logical operations according to the invention. These logical operations are performed by a component composed of modules M1, M2, M3, M4 and M5, which are interconnected with each other within the application server.

FIG. 1 illustrates technical devices required to deploy of a system for executing the invention. The system comprises a computer server 101 comprising an application server 108, in which the mutually interconnected modules M1, M2, M3, M4 and M5 are accommodated, a web server 107, a CPU 112, an input/output device 110, a random access memory 111 and a database 109. The system further comprises a plurality of user terminals 102, 103, 104, 105 which are connected to the web server via a network 106 such as the internet. The server 101 receives requests from the user terminals 102 to 105 having the role of clients. The server 101 receives these requests across its component web server 107, which is capable to interpret the protocols of the transmission of data across the network 106 such as the internet. The web server serves as an intermediary device between the user terminals 102 to 105 and the application server 108. In the application server 108, the logical operations are implemented, which treat the parameter issued by the requests from the clients and which produce the responses thereto, which are also transmitted via the web server 107, which rules the responses to the respective terminals from which the request has been issued by still using the same transmission protocol. The components 107 (web server) and 108 (application server) of the server computer 101 may be implemented as executable programs which permits the deployment and the distribution over the network 106 of the logical operations implemented in the framework of this invention. The database 109 is adapted to store durably information which can be read, modified or erased by the application server 108. The computer server 101 comprises, as each computer, a central processing unit 112 which executes successively logical operations, a random access memory (RAM) 111 which administers all the objects created by different (e.g. software) programs, and a communication unit (input/output unit) 110 for performing communication with external devices resp. the external environment.

The claimed component of the computer system, of which an embodiment of realization is described herein, comprises a plurality of modules, each of which may e.g. be implemented as software modules, and each of which is adapted execute well-defined tasks, thereby often interacting with each other. The component is deployed in the application server 108 which offers a favorable structure resp. framework for being deployed in a distributed computer network. Being implemented as an executable computer program in the ensemble of systems, the component which is proposed herein may be implemented as a sub-component of the application server 108. In practice, the used Application Server can be a JBoss AS, IBM Web Sphere, Glass Fish and the like. To the application server 108 are added five program modules M1 through M5, which have been constructed to implement the invention. The first module M1 of the program is adapted to construct the different instable subsets on the basis of configurations of users. The second module M2 is adapted to handle all the statistical calculations and statistical variants in the system. The third module M3 is adapted to evaluate all the results and to calculate different prognosis (resp. forecast) scores. The fourth module M4 is adapted to manage personnel accounts and personnel data of users. The fifth module M5 is adapted to communicate with payment interfaces and other interfaces of partner systems to the system shown in FIG. 1. Such partner systems comprise, for example, centers for managing the data of lotteries which are accessible to and hence integrated into the system of FIG. 1, are also capable to update the database 109 with the latest information on the results of drawings which have been performed in any of the connected lottery systems, including in particular the winning number combinations, on the winning kitties.

The user terminals 102 to 105 include all known supports a web browser or any other application software capable to realize a visualization of data and system elements as used in the system shown in FIG. 1 can be installed on. The user terminals 102 to 105 may be in any form such as a PC, a notebook, a tablet PC, a SmartPhone or cellular phone.

The first module M1 is programmed to be capable to present on the user interfaces 102 to 105 any information including the elements of configuration of any lottery system in dependency from the lottery system that may have been chosen by a user. Said configuration elements of a lottery system comprise notably information such as a number of tanks, the number of balls in the different tanks, drop-down menus and any elements related thereto as may be associated with a particular lottery system and any lottery tickets (lottery table, bingo card as the case may be) of any particular lottery system, refer for example to FIG. 3B. The first module is also capable to ensure the consistency of configurations between different options. It is for example capable to assure that a number which has been selected to be obligatory in the second option, can no longer be excluded in the following option, or that the numbers which have been excluded in the third option can no longer be qualifying in the subsequent options (i.e. such numbers do not appear any more in the instable set that is under construction). The first module is programmed and capable to realize simulations of transparent tanks filled with balls carrying the lottery numbers for any lottery system accessible and integrated into the system of FIG. 1. The first module is programmed and capable to manipulate these virtual balls in the tanks as in a real lottery. On the basis of manipulating these virtual balls, the user can construct all his instable sets in an interaction with the system which simulates a transposition of real physical objects. Each configurable option contains its configuration elements and obeys exact rules. The first module (M1) is programmed to be capable to follow such rules on the side of the server and also to send to each user terminal upon each transition between the steps, one or more scripts adapted to assure the instantaneous interaction with the users and this under strict respect of the rules of each step.

Like the first module M1, each of the modules M1 to M5 is subdivided into two major parts, namely a control unit and a calculating unit. In the control unit, an according software device permits to determine exactly as a function of the data received, the origin of a request (e.g. a user terminal or any other module), the type of response expected and the destination for the result to be provided. For his part, the calculating unit is capable to execute all the logical operations aiming to deliver the different results which the system expects from the respective module.

Figure 4A:
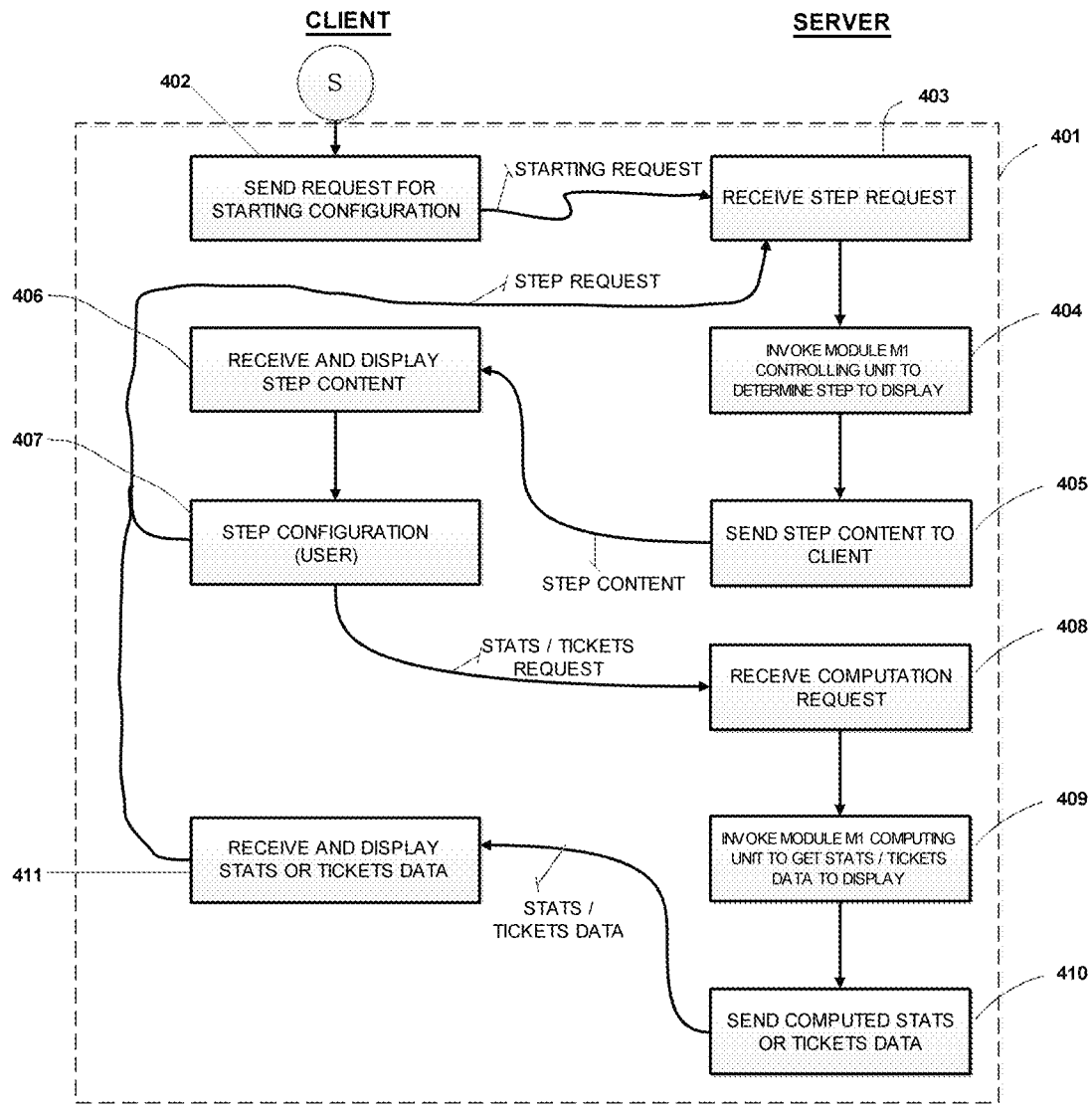
FIG. 4A shows the interactions during the configuration of a game.
Figure 4B:
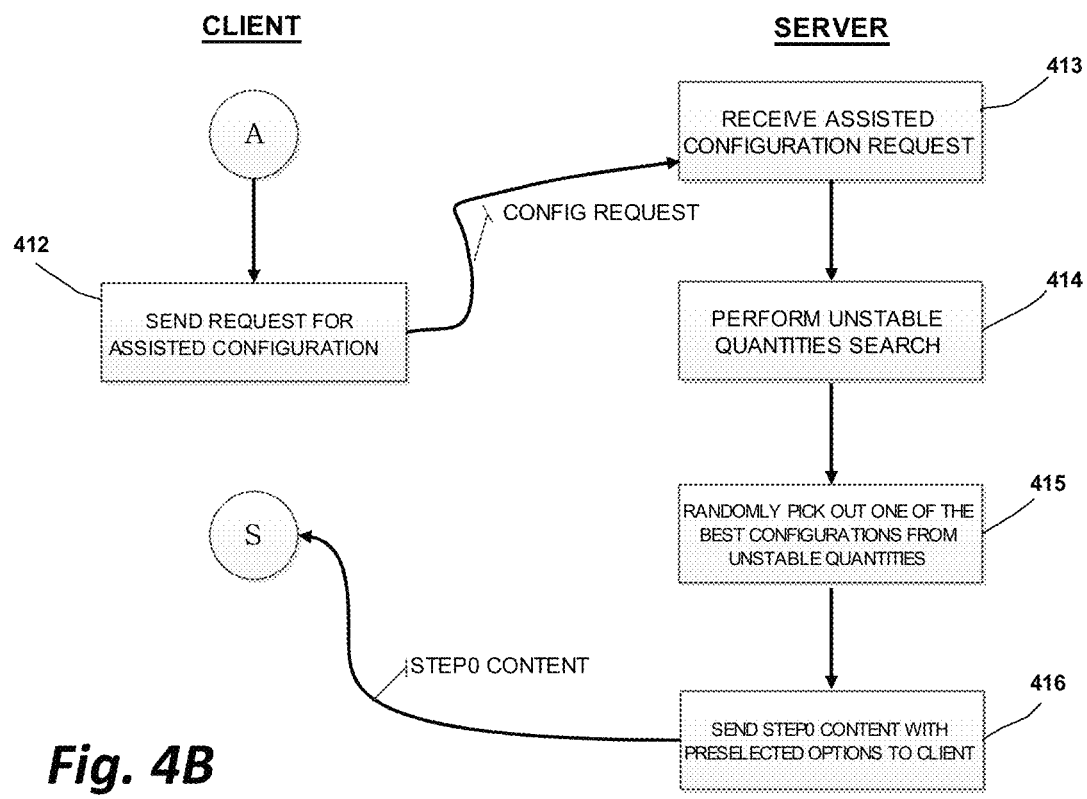
FIG. 4B shows the preparation of data and their return to a client (terminal) when the user invokes the assisted configuration.
Figure 4C:
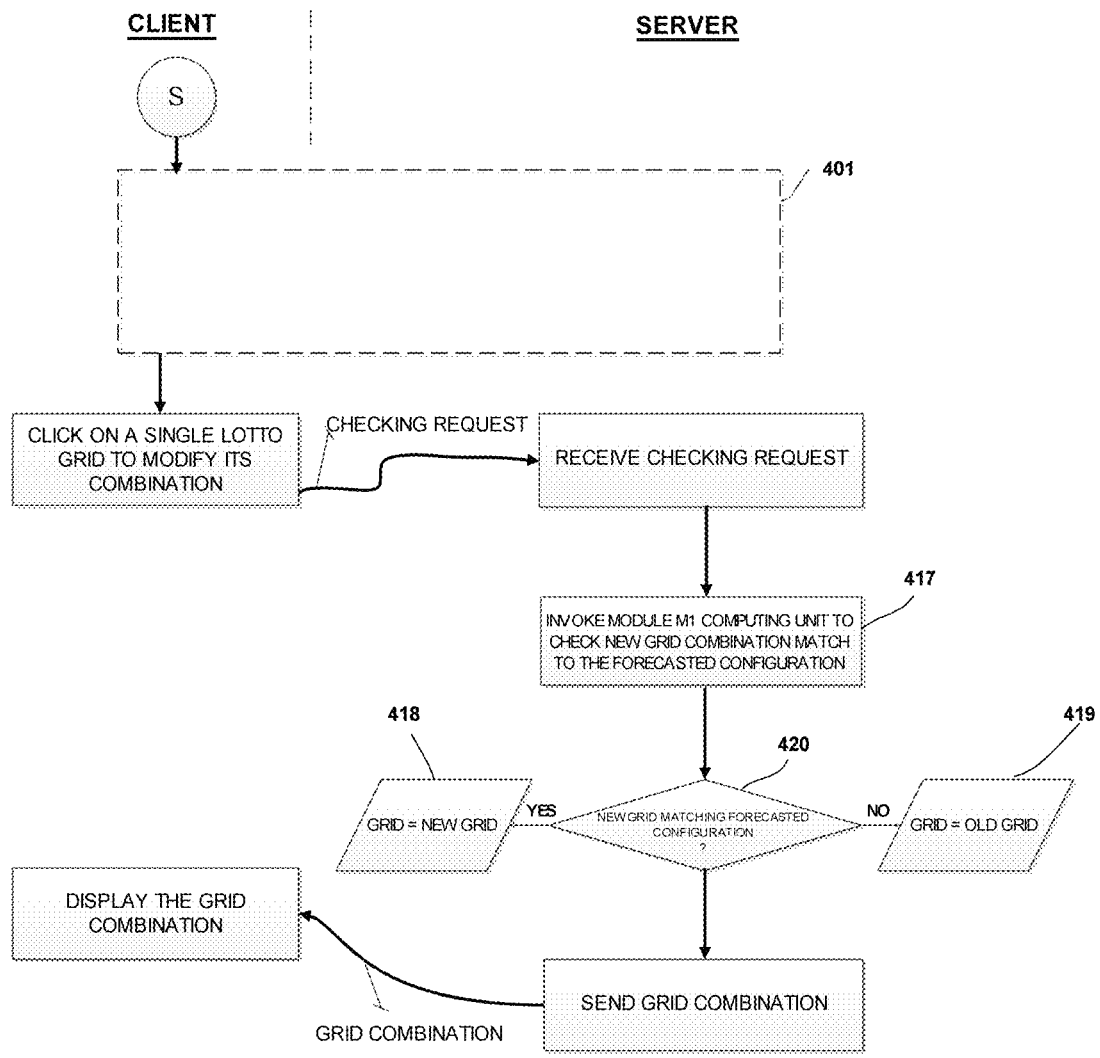
FIG. 4C shows the process of verification when a combination in a prognosis is being modified.

FIG. 4A illustrates the different implemented steps of interaction between any one of the clients 102 to 105 and the server 101 during the process of configuring the options of a game, e.g. a selected lottery system. After having chosen a particular lottery system 216, e.g. one of the type "p out of n", and the configurable options 217, a user may start a process S, e.g. by clicking on the button 218 in FIG. 2B. On the side of the clients, a starting request is sent to the server (step 402) which receives it (step 403). Then the server invokes the control unit of the first module M1 of the software system to determine the next configurable option (step 404). The first module M1 prepares the content of the following step as determined by its control unit and returns it to the client (step 405). The client receives this content and presents it to the user (step 406). The user can then configure the step according to his wish (step 407). After the configuration, the user can either invoke the following option, e.g. by clicking on the button "following step 204" in FIG. 2A, or the preceding step, e.g. by clicking on the button "preceding step 203" in FIG. 2A; for both cases, the control is given to the execution of box 403. In case the user invokes the personalized statistics, e.g. by clicking on the button 213 in FIG. 2A or the button 222 in FIG. 2C, or the generation of the combinations, e.g. by clicking on the button 221 in FIG. 2C, the server 101 receives the according execution request (step 408) and invokes the calculation unit of the first module M1 to evaluate the statistical values or to generate the combinations (step 409). The server prepares these results and returns them to the client (step 410) which presents this result (step 411). If these are results which are generated combinations, they are presented to the user, e.g. in the panel 208 of FIG. 2A, and the user may return to the initial page (initial screen) 215 shown in FIG. 2B in order to try out other configurations if he wishes to do so.

Figure 2A:
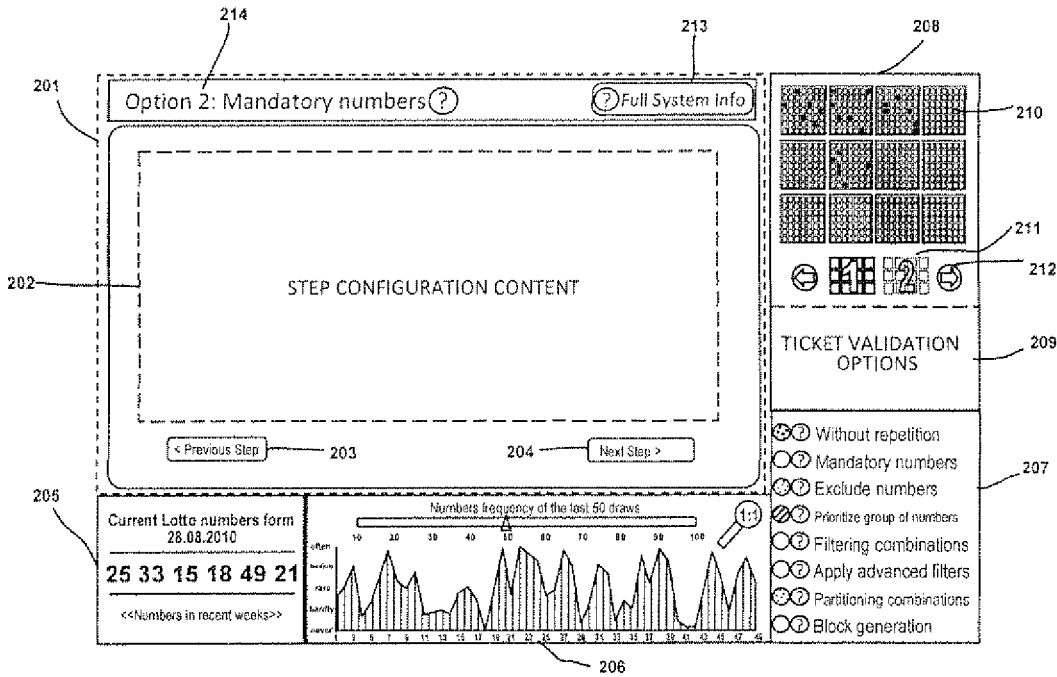
FIG. 2A shows a content of a user interface (in particular a terminal screen) when a user configures a game in order to reduce the number of instable subsets of the combinations.
Figure 2B:
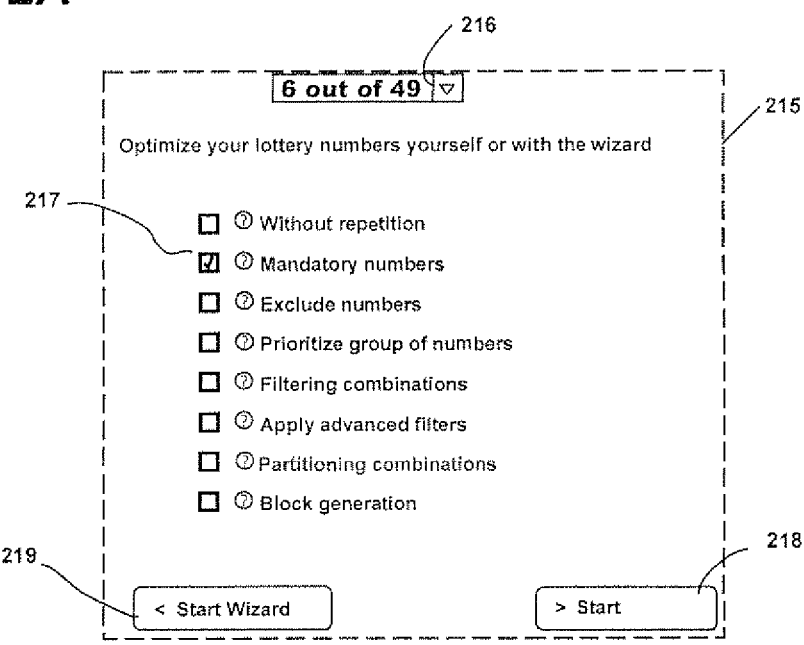
FIG. 2B shows the content (in particular a terminal screen portion) of an initial step.
Figure 2C:
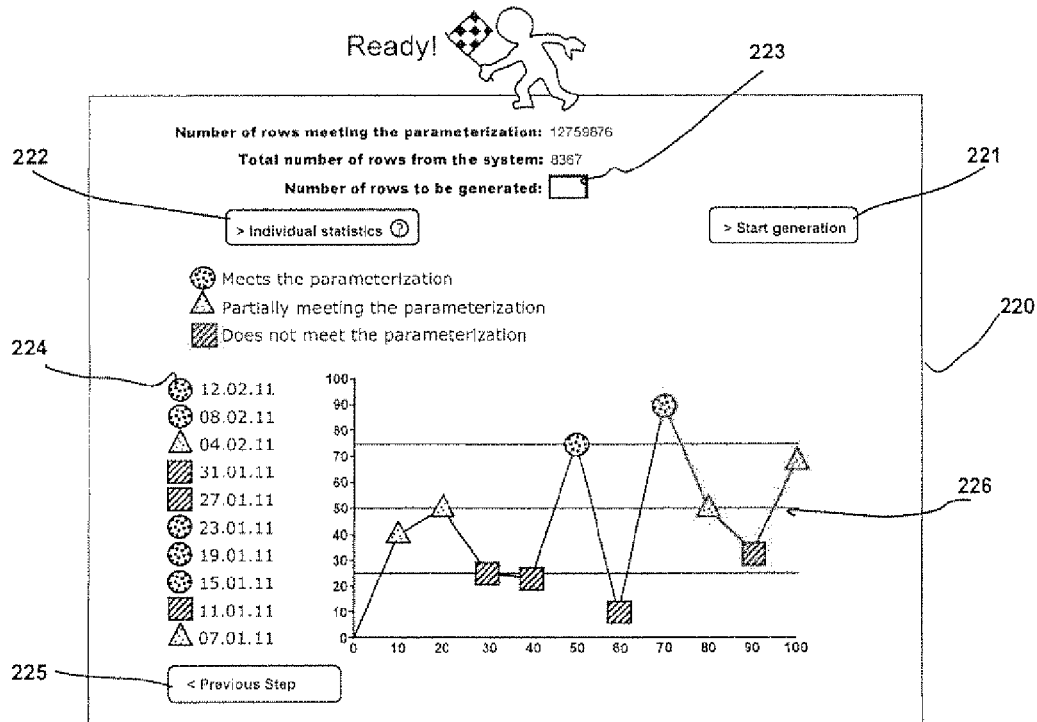
FIG. 2C shows the content of a final step. The contents of the initial and final steps and also those of the configurable options are loaded in the element 202 of the user interface.

The personalized statistics 213, 222 can be generated, e.g. by clicking on the button 213 in FIG. 2A, when the user is faced with the content (the results) of one of the eight major options, or, e.g. by clicking on the button 222 in FIG. 2C when the user is in the final step before the generation of the combinations. In both of these cases, the data are presented to the user (step 411) after treatment by the server 101 (steps 408, 409, 410). From this point of control on, the server is ready to receive a subsequent request (step 403), in particular e.g. to determine and return the content of a next option. This happens when the user clicks on the button "next step" 204 in FIG. 2A or on the button "preceding step" 203 in FIG. 2A in the framework of one of the eight configurable options and also when the user clicks on the button "preceding step" 225 in FIG. 2C, e.g. starting from the content of the last step, in order to return to the foregoing configurable option that has been selected.

The interaction between the client (one of the terminals 102 to 105) and the server 101 follows the control sequence shown in and described with respect to FIG. 4A in principal for all the configurable options and also for the initial content "Step 0" 215 shown in FIG. 2 and the final step "Step 9" 220 shown in FIG. 2C.

Figure 3A:
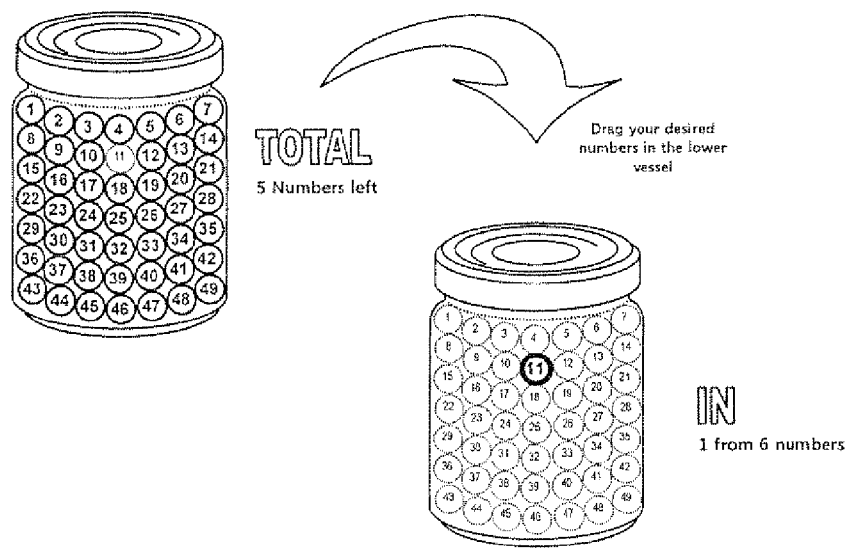
FIG. 3 is composed of FIGS. 3A through 3G, which illustrate, respectively, the contents (in particular the terminal screens) of the configurable options from the second option (option 2) through to the eighth option (option 8).

With reference to FIG. 3A relating to the second option of the eight major options, during the configuration of the second option of "selecting obligatory numbers", the user to whom is presented on its terminal the simulations provided by the system, must displace the balls (which represent e.g. lottery numbers) of his choice from the one tank containing all possible balls (Total) to another tank receiving the obligatory balls (In). The displacement of the balls takes place either by clicking on the selected ball in the tank Total or by usual drag and drop. The displacement can be performed in both directions. In the tank In, the selected obligatory balls take e.g. a green color while the other balls remain e.g. in a grey color (as an example of a sign of inactivity to indicate that these balls cannot be displaced). The number of green balls disposed in the tank In is indicated as a text on the screen close to the tank In and cannot exceed p (the number of numbers in each combination of the selected lottery system). At the same time, the number of numbers still selectable in the tank Total is also indicated as text on the screen close to the text indication of the number of already selected balls.

Figure 3B:
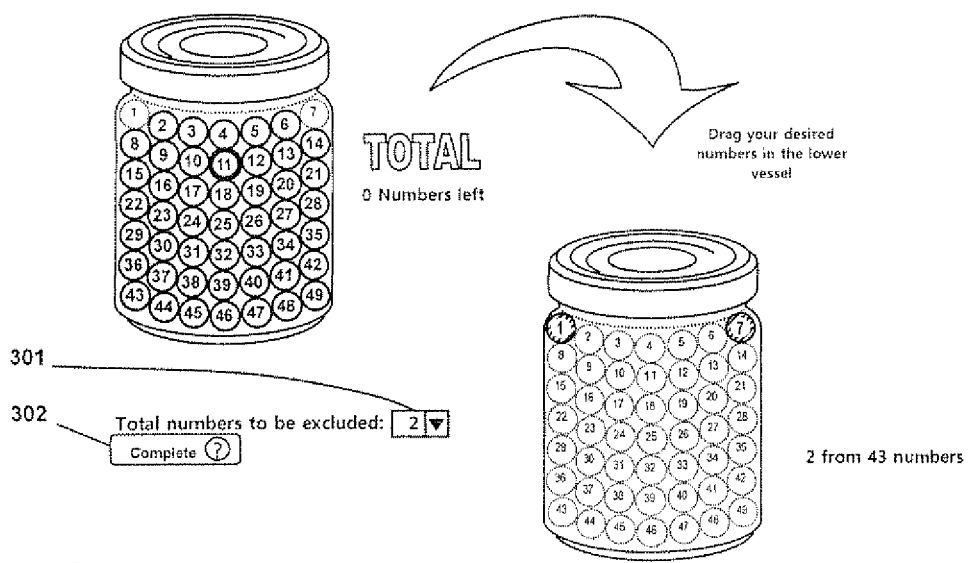

With reference to FIG. 3B related to the third option of the eight main options, when the user has selected the third option of "avoiding unlikely numbers", two tanks filled with balls (one labeled Total, the other labeled In) are presented to the user in a way such that the user can displace the balls (again representing lottery numbers) from one tank to the other one similar as in FIG. 3A related to the second option, but this time to indicate in the tank In the balls (numbers) which are unlikely and are to be avoided in the number combinations. The tank Total comprises the balls qualified for the validation of lottery tables (in the sense of non-avoided numbers) and is initially filled with "normal" balls indicated e.g. in white color and obligatory balls as selected under the second option and indicated e.g. in green color. The balls which a user has disposed in the tank In under the present third option represent those balls (numbers) which are to be avoided and which take, e.g. red color. The obligatory balls in the tank Total are irremovable and can only remain in the tank Total because the user has selected these balls under the second option, e.g. in the preceding step or screen, as obligatory balls (numbers). Inversely, the balls which are to be avoided under the third option cannot be selected as obligatory balls if for example the user returns back to the second option, if he wishes to reconfigure this second option. The balls (numbers) to be avoided will be marked e.g. with red color here as well as in the other options which the user may still configure. Still under the third option, it is foreseen that the user can let the system complete his selection of numbers to avoid. To this end, the user may select the number of total figures to be avoided (field 301 in FIG. 3B) and launch an automatic process of selecting balls to be avoided by activating button 302 in FIG. 3B on the screen associated with option three. The total number of numbers to be avoided must be greater or equal to the number of numbers which the user has eliminated until that point and must be smaller or equal to (n−p).

Figure 3C:
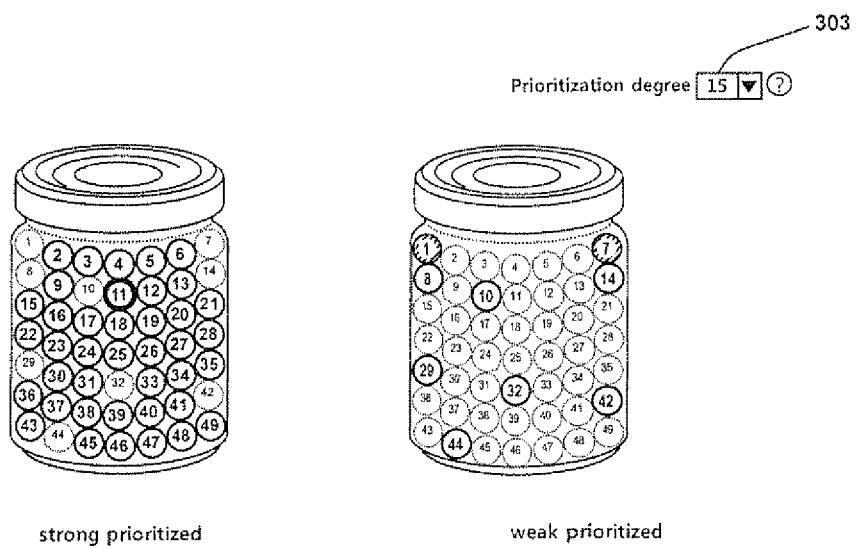

With reference to FIG. 3C associated with the fourth option of the eight main options, in said fourth option of "prioritizing a group of numbers", the user is presented the possibility to define two groups of numbers, where each group is indicated as being contained in one tank or basket, and wherein the first group of numbers contains numbers associated with a weighting factor defining a strong prioritization and the second group of numbers contains numbers associated with a relatively low weighting coefficient associated with a weak prioritization. In the associated screen presented to the user to configure the fourth option, as shown in FIG. 3C, the first group of strongly prioritized numbers is contained in a first (in FIG. 3C left) basket and the second group of weakly prioritized numbers is contained in a second (in FIG. 3C right) basket. Under the fourth option, as implemented, the user further must select a weighting factor representing a degree of prioritization, which is implemented e.g. as a drop-down menu 303 as shown in FIG. 3C allowing to select a number between 1 and 49. This number represents a prioritization factor, for example a percentage indicating a probability associated with the prioritization strength. As implemented, the second group of balls contains the weakly prioritized balls (numbers) and those which are excluded from any generated combination, i.e. they may not be present in any number combination.

With reference to FIG. 3D and FIG. 3E associated respectively with the fifth and the sixth option of the eight main options, and considering that the fifth and sixth option invoke filtering rules rather than selecting (or prioritizing) or deselecting (prioritizing weakly or avoiding) numbers as in the second to fourth option, it is clear that the configuration screen presented to the user for configuring these options must look different than the configuration screens of the second to fourth option, which are each implemented to comprise two tanks and balls to be selected in the tanks. In particular, the configuration screens for the fifth and sixth option comprise and mention the filtering rules applied in the respective options. With reference to FIG. 3D associated with the fifth option of "simple filtering of number combinations", the following filtering rules resp. filtering conditions are offered to the user for configuration: "Quantity of adjacent numbers", "quantity of even numbers", "quantity of odd numbers", "quantity of even and adjacent numbers", "quantity of odd and adjacent numbers" and "quantity of prime numbers". For each of these filtering conditions, an interval of integers can be specified by indicating the respective minimum integer and the respective maximum integer which is selectable by the user as indicated in FIG. 3D. With reference to FIG. 3E, under the sixth option of "applying advanced filtering rules to the combination" the following statistical parameter containing filtering options can be configured (set) by a user: "average", "length of a combination", "distance between two consecutive numbers", "quantity of repeated distances between consecutive numbers", "quantity of different distances between consecutive numbers", "quantity of different unit numbers", a quantity called "AC value", which is to explained elsewhere, can be configured. In an implemented embodiment, each of the aforementioned advanced (statistical) filtering rules of the sixth option can be configured (or set) by specifying for each filtering rule an integer representing a minimum value and an integer representing a maximum value. Under the sixth option, a regulating parameter, viz. "number of allowed mismatches" is offered to be configured (set) as shown in the field 306 in FIG. 3E. In the fifth and sixth option, each filter rule is represented by a pair of values (integers) which indicate the respective minimum and maximum value for this filtering rule. The respective filtering rule is applied to each generated combination of numbers at the end of the combination configuring process. The set of the chosen values is suitably selected to be a function of the lottery system selected. Logical rules are implemented as may apply, to the maximum and minimum values, according to which e.g. the maximum value readjusts itself dynamically and automatically if the minimum value is readjusted, and vice versa. The filtering rule "number of allowed mismatches" under the sixth option represents in fact a so-called degree of tolerance, and this is e.g. quantized in predefined intervals, in the illustrated example eight intervals, whereby the tolerance value 306 can take a unique value comprised in the interval from zero to seven.

Figure 3F:
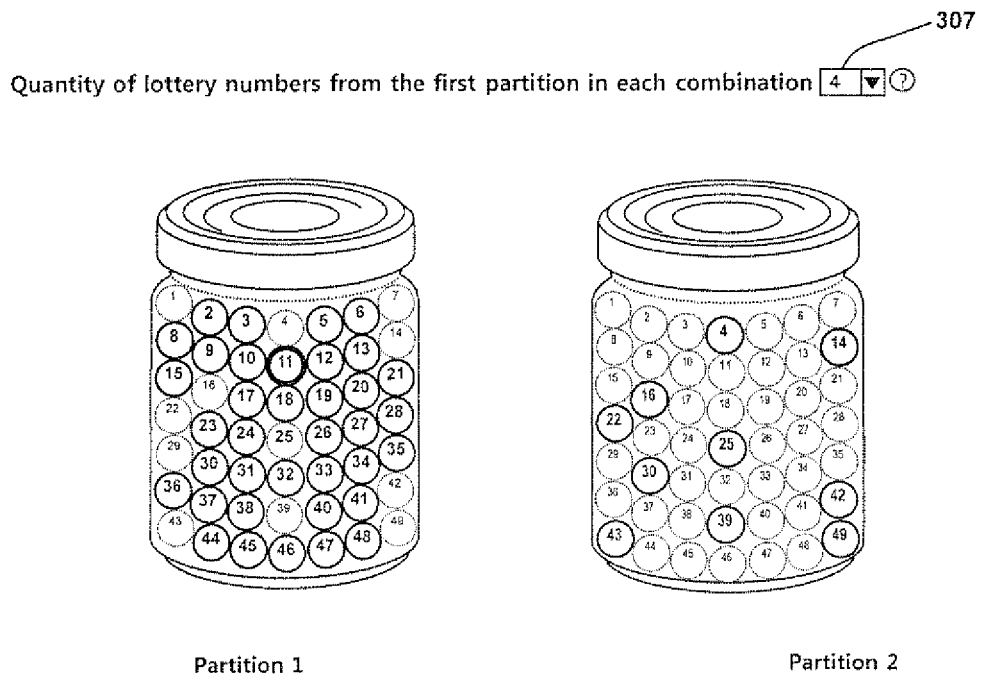

With reference to FIG. 3F illustrating a realization embodiment of the seventh option of the eight main options, the seventh option of "partitioning a combination in groups" allows the user to select at least two groups "partitions" of numbers and to set for each group (partition) a number of figures which must appear in each respective group (partition) selected. In a preferred embodiment, the set of all possible combinations is under the seventh option dividable into two groups (partitions), namely a first and a second partition, compare with FIG. 3F. The first partition contains numbers from which a defined number of numbers must appear in each generated combination. As such, the first partition includes all the obligatory numbers that may have been set in the second option, if any. The second partition comprises the remaining numbers, except all the numbers set under the third option as to be avoided. In the implementation of the seventh option illustrated in FIG. 3F, the user should specify the number of numbers from the first partition to be contained in each generated combination, refer to the field 307 in FIG. 3F, which is preferably implemented as a pull-down menu of allowable integers. In the implementation with exactly two partitions illustrated in FIG. 3F, again, the user can displace the balls (corresponding to lottery numbers) from one tank to the other and vice versa. The minimum in the pull-down menu is determined (is equal) to the number of numbers which the user might have set as obligatory numbers under the second option, while the maximum is given by the sum of the green balls and the white balls in the first tank, or this maximum number corresponds simply to the number p of numbers per combination, if this is less than said sum. Once the user has configured the seventh option, each and every combination to be generated by the system shall contain exactly the defined (by the value set in field 307 in FIG. 3F) number of numbers from the first partition and the remaining numbers must belong to the second partition.

Figure 3G:
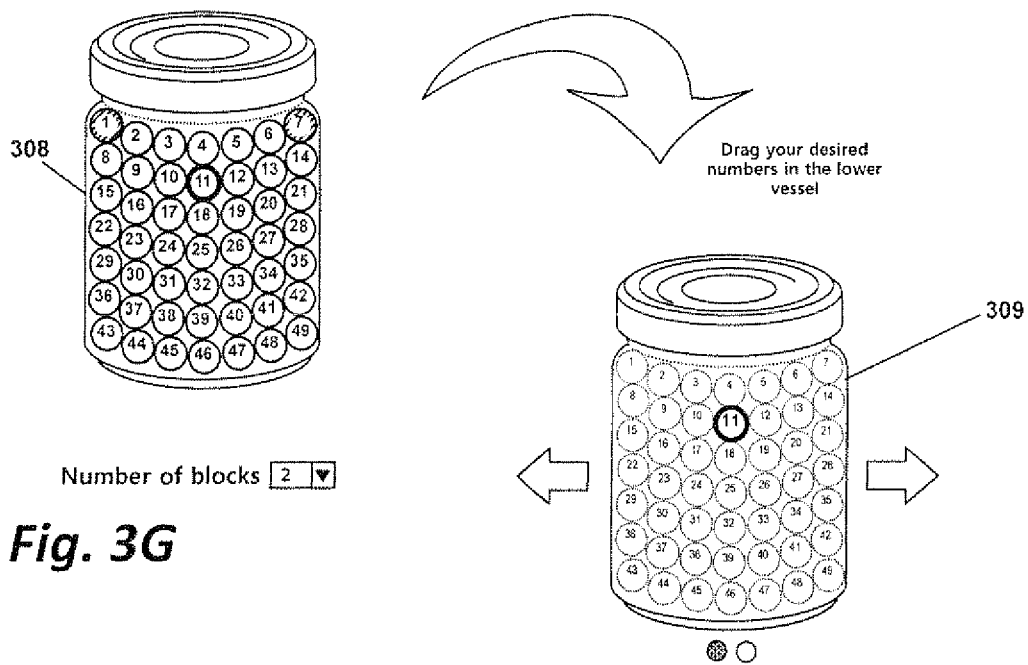

With reference to FIG. 3G associated with the eighth option of the main options, this eighth option which is termed "generate combinations from predefined blocks", involves in fact two sub-steps: a first sub-step of selecting a number of blocks to be created and a second sub-step of attributing balls (which represent lottery numbers) to the created blocks. In order to configure the eighth option, the user must select the number of blocs (comprised e.g. between 2 and 10). A first basket (308) comprises all the balls (which represent lottery numbers), wherein those which have been chosen to be obligatory retain their e.g. green color and those which have been eliminated retain their e.g. red color. The green and red balls remain irremovable in the first basket. Then, the baskets representing the other blocks 309 selected by the user. Initially, each basket representing a block comprises the green balls (obligatory and irremovable), all the balls which have not been eliminated are present there (represented in white color) and may be expelled to the common basket 308. The eliminated balls are inactive in the tanks of the block (where they are represented with a e.g. grey color). When the user raises the number of blocks, a corresponding number of baskets are transplanted to the baskets of blocks, with their initial values (green, white and grey balls). If on the contrary the user lowers the number of blocks, blocks are eliminated from the latter by uncrossing until they attain the desired number of blocks. The removable (white) balls can be displaced from the common basket 308 to a basket of a block 309 and vice versa. Contrary to all other options, the displacement of a ball from the common basket to a basket of a block does not eliminated the ball from the common basket (this means that this does not induce that the ball attains the grey color in this initial tank). But the inverse is true. In order to eliminate a ball from a basket of block, the user must click on the ball or otherwise make a drag and drop operation to the common basket. With the eight option been configured, each and every combination to be generated by the system will be fully included in one of the blocks. In other words, there would not exist a generated configuration whose numbers don't all belong to at least one block.

The interactive manipulations and the rules outlined for each option are possible thanks to the scripts the claimed component returns to the customers by means of its M1 module. These scripts form an integral part of the module and are activated by its control unit according to the next step to be presented to the user. In addition to the scripts, other information is also contained in the packet sent to the customer. In particular, it includes the state selected by the server for the step concerned. This state is for option 2, for example, the figures already chosen by the user as compulsory and the figures already eliminated. These states are updated and maintained on the server for each transition of states. They are represented in the JSON format (FIG. 9A) in order to be effectively interpreted by the scripts at the customer level.

The model-view-controller technical architecture is used to carry out functions and interactions between the server and the terminal on the one hand, and interactions between terminals and users on the other hand. The intra and extra-module communications are made by the usual procedures calls between the different methods implemented in the classes and scripts of modules. At the server level, a controller (called, for example, StepController) is responsible for determining the next step according to the data coming from the terminals. In general, this data consists of the configuration parameters of the step which has just been processed. In a preferred embodiment, this data is calculated on the terminal side by a script method (e.g. JavaScript) called for example getNextStep( ) and routed in the form shown in FIG. 9A. Conversely, the terminals load the calculated results in the server using AjAX technology such as provided by several frameworks for web application development (such as Zend, Symphony, Ruby On Rails, JSF, Wicket, Groovy On Grails, GWT, etc.). FIG. 9B and FIG. 9C show using pseudo codes how the data is processed at the terminal (9B) and server (9C) between two steps.

Once all its configurations are undertaken, the user is guided to a final summary step (220) before initiation of the automatic generation of his combinations. This summary step first presents two values calculated and routed through the server: the number of combinations in the unstable set built and the total number of chosen lotto system combinations. This is where the user indicates the number of combinations which must be randomly drawn from said unstable set and presented on the user interface. This final pre-generation step is always presented regardless of the options chosen by the user and moreover even if the user does not chose any option. In this step, personalized statistics can be invoked (see 226) by clicking on 222. The graph showing the congruence of the current configuration on the last 100 hundred draws consists of the percentage (on the y-axis) of draws in blocks of 10 (on the x-axis) which fully satisfy the step configurations of the user.

FIG. 2A shows the main elements of the user interface during the configuration of options. The contents of the different options chosen are placed in 202. Also placed there are the contents of the special steps "step0" (215) or "step9" (220). The tickets (208) contain the grids (210) which can be clicked on. These grids look like the lotto boxes traditionally found on paper. The combinations on each grid can be manipulated by the user. He only needs to click on it and check the desired boxes, also by clicking. Between the arrows (212) under the tickets are squares (211), each representing a particular ticket. The user uses the arrows to navigate between the tickets in order to focus on the ticket of his choice by clicking on it. All these interactions are performed by the methods inserted in the scripts which run in the user terminals.

Figure 5A:
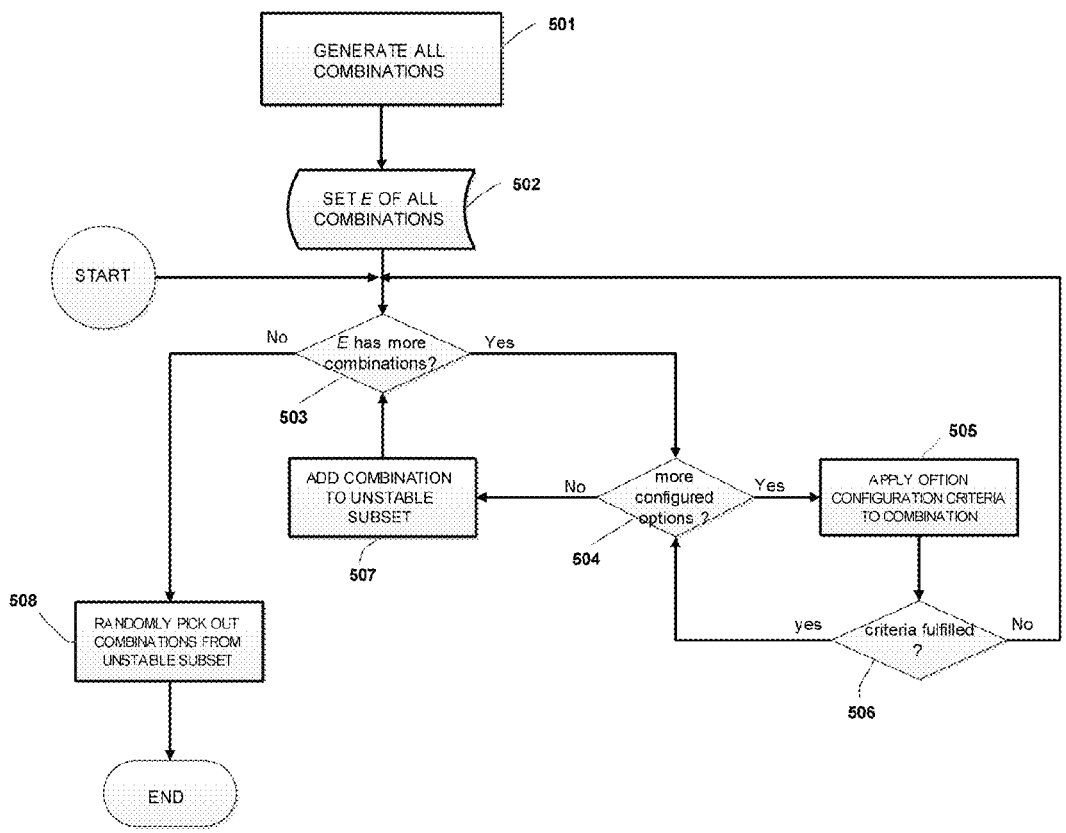
FIG. 5A shows the process of searching and generating the combinations in the server.

The calculation unit of the M1 module implements the algorithm of Kenneth H. Rosen [Ref. 2] in order to build (501) all the combinations of any lotto system of p figures in n. In a preferred embodiment, combinations generated in this way are maintained in an object in the random access memory 111. This object is valid while the application is functioning and thus lasts for users' sessions. FIG. 5A illustrates the process of generating combinations from a game configuration. All combinations are initially considered (502) and undergo a test (503) for criteria satisfaction (505) of the different options (504) chosen. Each combination satisfying all the criteria of all the options chosen (506) is added to a list (507) constituting the unstable set from the configuration of options. At the end of the iteration, a number of combinations are sorted at random from the unstable set (508). This number corresponds to that indicated on the user interface before launching the generation process.

To obtain individual statistics, the M1 module communicates all configurations to the M2 module. For the textual form of these statistics, configurations are used to determine the number of combinations in the unstable set formed up to the current option where the user is. Deduced from this number is the relationship to the total number of combinations for the lotto system considered. The process described in FIG. 5A is also used at this level to determine the unstable set.

Figure 5B:
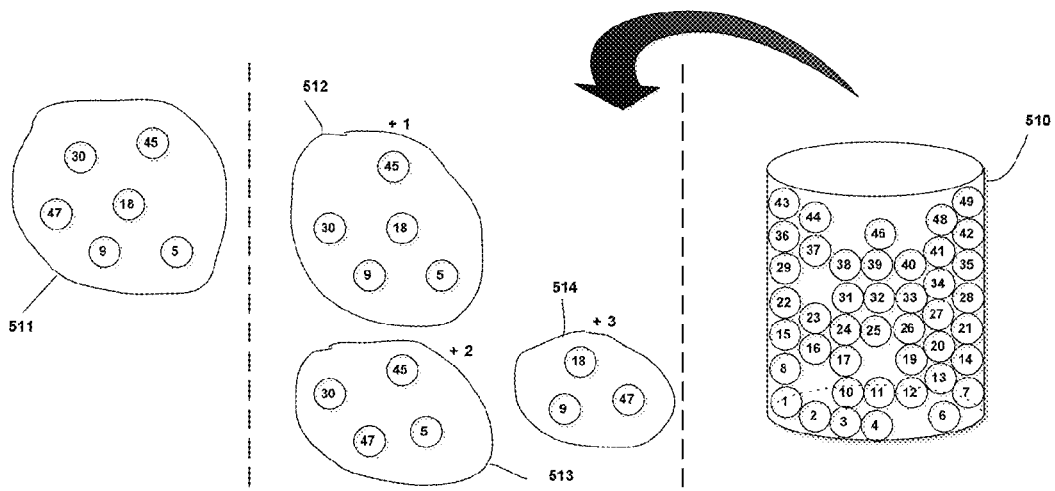
FIG. 5B shows examples of sub-combinations of a given combination.

The graph form of individual statistics (226) requires more advanced calculations because of the color to be determined for each of the recent draws taken into account. First, each of the last 10 draws undergoes the criteria test for all of the options configured. If the test is positive in the first try, the color is green for the corresponding date. If not, the server performs an evaluation of sub-combinations (see FIG. 5B) to determine the color to be displayed for the corresponding date. For this, each sub-combination of the draw will be completed by the numbers belonging to the complement (510) of the figures of the combination (511) in the rest of the set of possible figures. Thus one figure will be completed in the sub-combination 512, two figures in 513 and three figures in 514. The sub-combinations considered must each have at least the defined minimum number of figures to win in the chosen lotto system. If a completed sub-combination passes the options criteria test, the color is yellow for the corresponding date. If none of the sub-combinations completed pass the test, the color is red.

Sub-combinations are not considered for calculating the percentages presented in the graph 226. Here, only the combinations of the last 100 draws undergo the options criteria test. Per block of 10 draws, the quantity of draws having obtained the green color determines the value on the y-axis.

The claimed component enables the use of assisted configuration. To do this, the user must click on 219 and then indicate how many combinations should be generated from the configuration. After, the customer sends the request 412 to the server to obtain a proposed configuration. The server records 413 the request and performs 414 a search for good unstable sets. The best ones are those with low instability. The system takes this into account in choosing 415 the best configuration, i.e. the best unstable subset. Once the automatic choice of configuration has been completed, the server sends 416 the data to the customer which displays the "step0" step with a preselection of configurable options. The user can then simply confirm the preselected configurations or modify them if he wants before the automatic generation at the end of the configuration process.

The M3 and M4 modules are extensively used in achieving the collaborative approaches of the system. M3 interchanges with M1 for the issuance and management of predictions in the application and with M4 to establish the connection between predictions and user data. The link between predictions and users is fundamental to the reuse of predictions and hence also for the realization of collaborative optimization of strategies in the system.

To reuse a prediction, the user can use a table showing the best predictions of any system or a table that summaries all of his own predictions. The latter table includes all his predictions with their respective assessment, the detailed score, the compact score, and the compact score of the best predictor along with his alias. From these tables, the user can choose a prediction which he uses to produce an actual lottery configuration. This is the first collaborative approach of the system. A particularly interesting configuration can thus be used by thousands of users.

Predictions are recorded on the system's database 109 in readable format by the M3 module. This module can load each prediction, decipher it and thus preconfigure the options ready to be used for a real lottery.

Another collaborative approach, even more participatory, is played around the concept of virtual user clubs. Users are given the possibility to create, join or access a club consisting of a restricted circle of participants. Within a club, it is possible by email to: invite friends, colleagues, and acquaintances to join the club; send electronic messages to club members; confirm the membership of members; remove one or more members; and dissolve the club. The whole point of the club is to manage lottery strategies in a restricted circle, as in the participation in internal club competitions or in competing against other clubs. Internal competitions can be initiated by any club member who must specify for that purpose which actual draw he is initiating the competition for. There is the possibility to communicate via user aliases inside the club. In addition, any club member can consult the results of an internal or global competition of predictions. A global competition being a competition between all clubs based on the same lottery system. In such a competition, the best club is that where the sum of the 10 best predictions combined of its members is the highest.

Figures 6, 7:
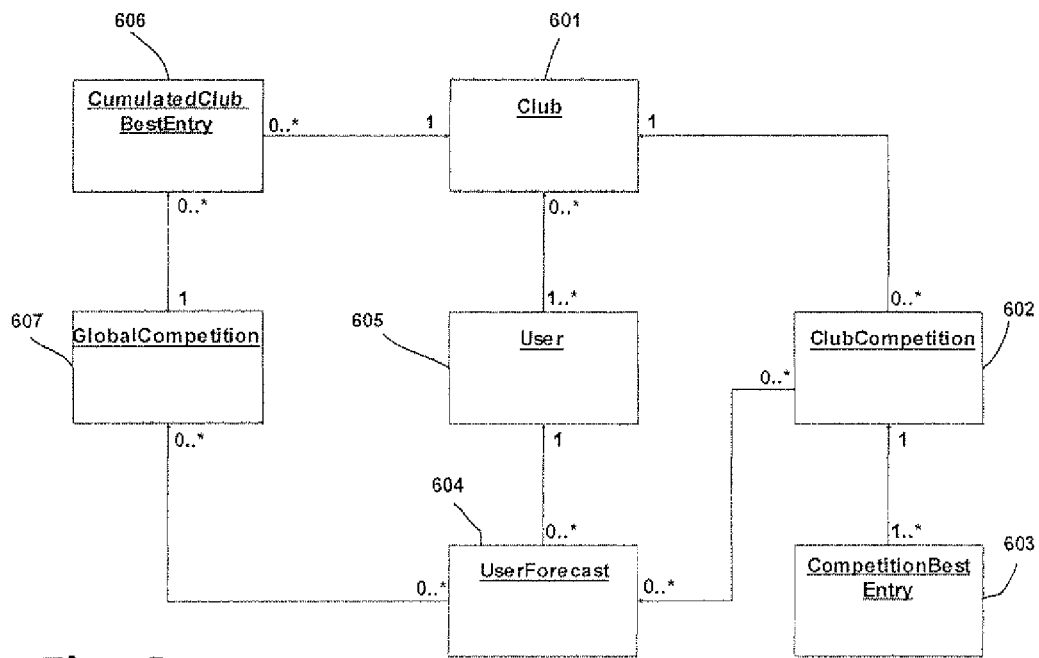
FIG. 6 shows the units and connections as used by the server in order to implement a collaborative function on the basis of virtual clubs and competitions based on prognosis of users.
FIG. 7 shows the principal elements of a user interface used for the creation, adhesion or comparison of participant groups (e.g. syndicates).

FIG. 6 shows the connections which the M3 module uses to manage both global competitions and those organized internally in clubs 601. The prediction 604 of a user 605 can be evaluated both for an internal competition 602 and for a global competition 607. The evaluations of internal competitions are administrated in the entity 603 while those of global competitions are in 606. All these evaluations are stored in the relational database 109 of the system.

The third collaborative approach is performed on the possibility of bets in groups. The idea of these bets is to collect the bets of different gamblers in order to validate for them a large number of lottery tickets. In the event of a win from the combinations validated in this way, the gamblers receive their dividends according to their contributions in the group at the start of the draw. The system once more uses the mechanism of configurable options to offer a unique way to directly involve the users in the process of decision-making, and of implementing the gaming strategies of groups. The user can select any existing lottery system to see the groups already formed (see FIG. 7). He can scrutinize the strategies of each group 701, communicate 702 with the captain of the group—i.e. its creator 703, and decide to join the group 704. Lastly, he can also decide to become group captain himself by creating one 705. The creation of a group consists of the same steps as the process for issuing predictions, except that more information is required after configuration and validation of the latter option. Here, it is necessary to indicate the dates of the draws in which the group is taking part, the number of grids per draw, and the validity of the tickets to be generated. Based on these indications, the total amount of the group's bet is calculated. The element 706 indicates the degree of completion of a group. A group is all the closer to its completion, the larger the relationship between the sum already collected and the total amount of the group. All this information can be accessed by users and provides them with a basis to decide whether or not to join groups. Finally, the combinations qualified to take part in the actual draws are accessible only to members of the corresponding groups.

FIG. 7 shows the elements visible to the user at the time of scrutinizing and/or choosing a gaming group. By clicking on 707, he obtains a view of the configuration of the corresponding option. This information is presented in a form identical to that which is obtained in the lottery configuration process (see FIG. 3A-3G), except that they cannot be changed at this level. (702) enables the sending of an electronic message to the captain: a page to edit the message is opened with the recipient's address as the alias of the captain. The system loads internally to find the real electronic address of the captain and to send him an email from where he can also read the alias of the sender. Using this alias, the captain can also send an electronic message to the sender of the initial message. It is through this mechanism that the system ensures communication between users without revealing their addresses, much less their names. If the user clicks on 704, he obtains a simple form which indicates the level of his participation in the group. After confirming this form, the name of the new group is listed in the summary table where the user can see all groups which he is joining or has joined.

Apart from module M2, all other modules of the claimed component performed process data and communicate it in order to complete gaming groups and manage the plethora of rules implemented to simulate the real and transparent management of these groups. The entities used in the program to implement this collaborative management of the gaming groups are presented with their different connections in FIG. 8. For each gaming group 801, a virtual account 807 is created to manage contributions and the winnings of the group. To each lottery system 802 several draws can be linked 803 of which the respective results 804 are evaluated as soon as they are known. Each gaming group is created by exactly one user 808 who configures one or more gaming options 806 for the group.

In principle, the system activates the process 401 during the creation of a group with the exception that the captain himself does not generate combinations. The operation 408 is thus activated there at most for the request of statistics. In addition to the indications listed, the captain also indicates his personal contribution to the group's total bet. Once the required information is provided, the process of creating the group can be completed.

With the flow of information maintained in the database 109 and in the Server Application 108 on the gaming groups formed, the system can impose a series of rules on the presentation or not of groups on the user interface, on the manipulation of combinations of groups generated, and on the conditions for joining a group, etc. Displayed on the dedicated page of gaming groups for each lotto system previously chosen is an ordered list (see FIG. 7) of the groups which can actually be joined (these are the groups whose membership deadlines have not yet expired and thus the maximum contribution has not yet been attained due to the accession of members). The group closest to its completion is placed at the top. Each completed group can no longer be joined. If two groups present the same completion report on the list, the one placed higher would be the group whose membership deadline is closest.

All members of a given gaming group are informed at the end of each draw in which the group is participating. In case of a win, each member receives a dividend proportional to his contribution at the start of the draw. This dividend is automatically credited to his member account from where he can decide to make a real transfer into his bank account if the dividend is convertible into currency. The system therefore ensures full transparency in the management of gaming groups.

Several modifications and other embodiments of inventions described in this document may be produced by a spirit initiated in the area to which these inventions relate, and which would benefit in particular from the instructions and figures presented in the descriptions contained here. Consequently, it is understood that the inventions should not be limited to the specific examples described and that modifications and other embodiments are intended to be included in the scope of the accompanying claims. Although specific terms are used here, they are in a generic and descriptive sense only and not for restrictive purposes.

References

Ref. 1: Lotfi A. Zadeh et al., "Fuzzy Sets and Applications", John Wiley & Sons, Inc., 1987, pp. 29-44.

Ref. 2: Kenneth H. Rosen, "Discrete Mathematics and Its Applications", Sixth edition (NY: McGraw-Hill, 2007), pp. 384-385.

What is claimed is:

1. A computer system comprising:
    at least one server computer configured to interact with user terminals that are physically distant from said server computer and from each other, wherein the at least one server computer is configured to interchange data with said user terminals across a computer network; wherein the at least one server computer includes one or more processing devices and one or more memory devices containing software instructions that, upon execution by the one or more processing devices, results in implementation of operations relating to computer-assisted selection of combinations for a game based on selecting combinations of numbers, the operations comprising:
    a) offering to one or more users of the user terminals configurable options in an interactive mode to enable the one or more users to select individual configurations by which to form subsets of combinations from which final combinations will be selected;
    b) evaluating statistics based on individual configurations selected by the one or more users based on the configurable options selected in the individual configurations;
    c) assisting the one or more users in the formation of subsets of combinations by searching the subsets with weak instability; and
    d) presenting at least a portion of the combinations, statistics, or both for display on a display of at least one of the user terminals.

2. The computer system according to claim 1, wherein the operations further comprise generating a prognosis of the game based on at least one of the individual configurations by letting the system generate up to a predetermined number of combinations which correspond to a given configuration.

3. The computer system according to claim 1, wherein the operations further comprise: saving said configurations of games of users in a database; and
    for a particular user, automatically reusing configurations generated based on that user's configurations or based on configurations of one or more other users.

4. The computer system according to claim 1, wherein the operations further comprise organizing a competition based on one or more evaluations of users' game prognoses, based on configurations stored in a database.

5. The computer system according to claim 1, wherein the operations further comprise:
    loading contents of each selected option;
    performing configuration of each selected option; and
    using said configuration of each and every selected option to generate optimized combinations for an arbitrary lottery system.

6. The computer system according to claim 5, wherein the operations further comprise using said configuration to calculate individual user statistics.

7. The computer system according to claim 6, wherein performing configuration comprises:
    enabling the configuration of options in steps, wherein the configuration of each option constitutes a distinct step, and
    enabling exchange of configuration parameters of said options between the user terminals and a module of the at least one server computer which determines a next step, calculates combinations, or evaluates statistics.

8. The computer system according to claim 7, wherein the operations further comprise invoking a following step or a preceding step to a present step.

9. The computer system according to claim 7, wherein the operations further comprise presenting a set of all the configurable options that are available to be chosen in a step preceding the configuration of a first selected option.

10. The computer system according to claim 7, wherein there is at least one step between the configuration of a last selected option and invocation of the generation of the combinations.

11. The computer system according to claim 1, wherein the operations include providing to the one or more users at least one of the following options:
    a) permitting to prevent two generated combinations from having exactly the same numbers;
    b) permitting to select numbers to appear in all generated combinations;
    c) permitting to select numbers that may not appear in any generated combination;
    d) permitting to select a group of numbers, to which a weighting coefficient is attributed, defining a probable frequency with which these numbers are to appear in the generated combination;
    e) permitting to use at least one filtering criterion to prevent combinations that do not meet the at least one filtering criterion, wherein the at least one filtering criterion is selected from the group consisting of: a minimum and a maximum of adjacent numbers; a minimum and a maximum of even numbers; a minimum and a maximum of odd numbers; a minimum and a maximum of even and adjacent numbers; a minimum and a maximum of odd and adjacent numbers; and a minimum and a maximum of prime numbers;
    f) permitting to use at least one filtering criterion to prevent combinations that do not meet the at least one filtering criterion, wherein the at least one filtering criterion is selected from the group consisting of: a minimum and a maximum of average values; a minimum and a maximum of lengths of combinations; a minimum and a maximum of distances between consecutive numbers; a minimum and a maximum of repeated distances between consecutive numbers; a minimum and a maximum of different distances between consecutive numbers; a minimum and a maximum of different unit numbers; and a minimum and a maximum of AC values;
    g) permitting to define at least one tolerance criterion;
    h) permitting to select at least two groups of figures and to set for each group a number of numbers which must appear in each generated combination; or
    i) permitting to select at least two blocks of numbers and to oblige all the numbers of each generated combination to belong to at least one of the blocks.

12. The computer system according to claim 2, wherein the operations further comprise providing to a user an opportunity to modify the combinations of a prognosis.

13. The computer system according to claim 12, wherein the operations further comprise verifying that each modified combination of the prognosis still satisfies criteria of a configuration of said prognosis.

14. The computer system according to claim 2, wherein the operations further comprise displaying the results of user prognosis in a table organized according to scores of the prognosis.

15. The computer system according to claim 1, wherein the operations further comprise allowing each user to create or to adhere to virtual clubs so as to interchange gaming strategies in a society restrained to users and to take part in prognosis competitions of the clubs.

16. The computer system according to claim 15, wherein the one or more server computers are adapted to enable displaying the results of the prognosis of clubs in a table organized according to accumulated scores of the prognosis of members of the clubs.

17. The computer system according to claim 1, wherein the operations further comprise allowing users to create or to adhere to one or more gaming groups in the network so as to take part in real drawings of a lottery system.

18. The computer system according to claim 17, wherein the operations further comprise calculating and presenting to members of each group the results issued from the drawings in which the group takes part and a possible gain of each member calculated in proportion to a contribution of each member during construction of the group.

\* \* \* \* \*